United States Patent [19]
Nakano et al.

[11] 4,068,588
[45] Jan. 17, 1978

[54] PRINTING USING AN ELECTROCHROMIC IMAGE

[75] Inventors: Keita Nakano, Yokohama; Mutsuo Takenouchi, Isehara, both of Japan

[73] Assignee: Rank Xerox Ltd., London, England

[21] Appl. No.: 748,807

[22] Filed: Dec. 8, 1976

[30] Foreign Application Priority Data

Dec. 26, 1975 Japan .................................. 50-154719

[51] Int. Cl.² ........................ B41C 1/10; G03G 13/28; G03G 13/044
[52] U.S. Cl. ..................................... 101/466; 96/1 R; 96/1 E; 101/DIG. 13; 101/451; 355/3 R; 355/3 TE
[58] Field of Search ............... 101/DIG. 13, 450, 451, 101/426, 463, 465, 466; 355/3 TE, 3 R

[56] References Cited

U.S. PATENT DOCUMENTS

| 1,880,449 | 10/1932 | Hickman et al. | 204/2 |
| 1,970,539 | 8/1934 | Bausch | 204/2 |
| 2,713,822 | 7/1955 | Newman | 346/76 R |
| 3,422,759 | 1/1969 | Brynko et al. | 101/450 |
| 3,516,911 | 6/1970 | Hopps | 346/135 |
| 3,596,284 | 7/1971 | Zaphiropoulos | 101/1 |

FOREIGN PATENT DOCUMENTS 836,777 3/1970 Canada ..................................... 101/1

Primary Examiner—Clyde I. Coughenour

[57] ABSTRACT

A display and printing method using an electrochromic imaging material. The electrochromic material forms a colored image in response to the formation of an image pattern on a photoconductive surface. The electrochromic material is between an electrode and the photoconductive surface when image formation takes place. The image may be utilized in a display device or in printing.

6 Claims, 4 Drawing Figures

PRINTING USING AN ELECTROCHROMIC IMAGE

BACKGROUND OF THE INVENTION

The present invention relates to an offset printing method using an image recording element, which specifically comprises a conductive transparent base plate, a photoconductive layer, a layer composed of an electrochromic material, and a conductive transparent electrode.

One display device utilizing a reversible oxidation-reduction color reaction of electrochromic material is disclosed in U.S. Pat. No. 3,736,034 hereby incorporated by reference. The principle of operation of electrochromic material in the aforesaid publication will be explained in reference to the drawings.

In FIG. 1, an electrochromic material 3 sandwiched between two electrodes 1 and 2 is transparent when switch 4 is open while it is colored on the side of cathode when the switch 4 is closed. The reference numeral 5 designates a transparent base plate, 6 a spacer and 7 a bias power source.

FIG. 2 shows a display cell in which, for example, an aqueous solution of benzylbiorogenchloride is sandwiched between two sheets of glasses. One glass is internally provided with a common electrode 8, and the other is provided with a number of display electrodes 9. When negative voltage of $-1V$ with respect to the common electrode 8 is applied to the display electrodes 9, electrons cause biorogen ion on the display electrodes to be colored in blue. This blue coloring matter is insoluble in water and forms a thin layer of coloring matter on the surface of the display electrodes 9. The numeral 10 is a wiring to the display electrodes 9.

Representative of a reaction formula as utilized in the instant invention is given in the following:

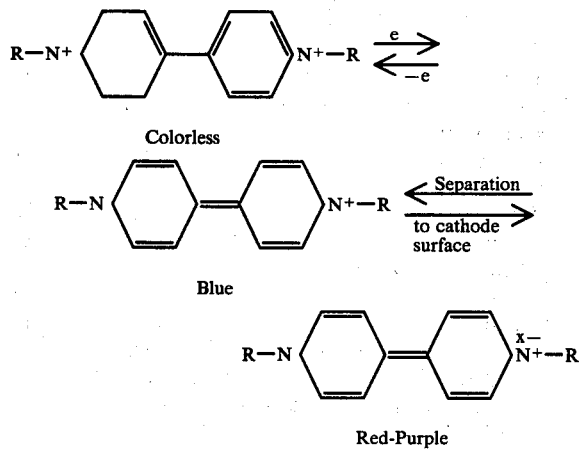

Colorless

Blue

Red-Purple

R may be $CH_3(CH_2)_5$, $CH_3(CH_2)_6$ or $C_6H_5CH_2$

In this case, even if the voltage is removed, the layer of blue-purple coloring matter remains on the electrode to exhibit memory characteristics. This image may be erased by application of voltage opposite in polarity between the display electrodes or by short-circuiting between the electrode. That is, the biorogen ions emit electrons to the display electrodes and returns to its initial colorless state causing the blue-purple color to disappear.

The conventional operating process of the display element using the electrochromic material has been discussed, but this method suffers from the following drawbacks. Since the electrodes are used for the purpose of display, the images to be displayed are determined depending upon the shape of display electrodes, and hence, other shapes are not possible. This method further poses a disadvantage such that input entered is in the form of an electric signal, and therefore, where light is desired to be used as input, direct input is impossible.

Lithographic printing is a well-known and established art. In general, the process involves printing from a flat plate, relying upon the existence of different properties in the image and non-image areas for printability. In conventional lithography, the non-image area is hydrophilic while the image area is hydrophobic. In the lithographic printing process of a fountain solution is applied to the plate surface which wets all portions of the surface not covered by the hydrophobic image. This solution keeps the plate moist and prevents it from scumming up. An oil based printing ink is applied to the image bearing surface depositing the lithographic ink only on the image area, the hydrophilic wetted non-image area repelling the ink. The ink image may then be transferred directly to a paper sheet or other receptive surface, but generally it is transferred to a rubber offset blanket which in turn transfers the print to the final copy sheet. Hence, for each print made during a run, a lithographic plate is first dampened with an aqueous fountain solution, inked with a lithographic ink and finally printed either directly or by offset techniques.

A number of techniques are known for preparing lithographic printing plates. In a majority of instances, the substrate material upon which the oleophilic image is developed is itself hydrophobic and requires the application of secondary solutions referred to as conversion solutions which render the background, non-image areas hydrophilic. Therefore, while basically the presently known systems have been found to be useful for lithographic purposes, there are existing inherent disadvantages to their use.

When printing with the conventional lithographic printing plates it is difficult to determine the quality of the printing master other than by copy formation. The image and nonimage areas are substantially the same color and visual inspection does not reveal any meaningful differences. Further, it may be difficult to determine that the cause of a poor quality print is the master and not failures in the operation of other components of the printing process. Therefore, it would be of advantage to have a method of forming printing masters which could be easily visually inspected for defects.

In the formation of displays by the above described method of U.S. Pat. No. 3,736,043, it is necessary that electrodes be placed so as to allow image reproduction. This limits the images formed to those areas and shapes served by previously constructed controls and shapes.

It is, therefore, an object of this invention to overcome the above noted disadvantages of previous systems.

It is a further object to form printing masters which may be easily visually inspected.

It is an additional object to form electrochromic images from light images.

It is another object to form clear offset printed images.

It is a further object to form clear, sharp display images.

It is again an object of this invention to form a printing master that may be easily erased.

It is again another object of this invention to form a colored printing master.

SUMMARY OF THE INVENTION

These and other objects are accomplished generally in accordance with the present invention by providing a method of allowing imagewise exposure to electromagnetic radiation, such as light, to activate the electrochromic material thereby forming an image in the pattern of light. This is accomplished by placing the electrochromic material between a photoconductive element and an electrode. The photoconductive material is exposed to light in an image pattern creating conductive portions which act as electrodes thereby forming images of the electrochromic material in the exposure pattern. This image may either be utilized in a display device or as an image for a master used in offset printing.

In a preferred embodiment of the invention, the electrochromic image is used in an offset printing process. The electrochromic image on the electrode is attractive to the lithographic ink used in offset printing.

Figure 1:
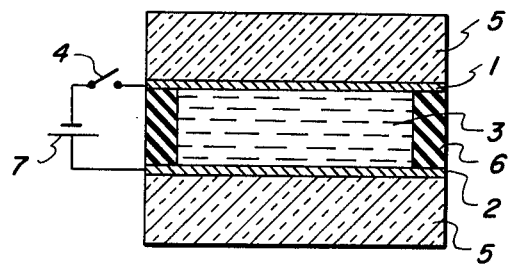
FIG. 1 is an explanatory view of an image recording element.
Figure 2:
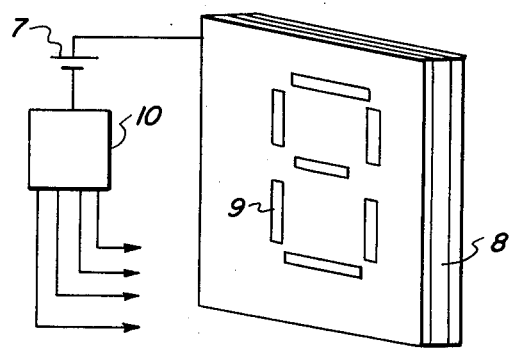
FIG. 2 is an explanatory view of a display cell.

Reference numeral 3 designates an electrochromic layer, 5 a conductive transparent base plate, 8 an opposed electrode, 11 a photoconductive layer, 18 a transfer paper and 21 a colored image.

DETAILED DESCRIPTION OF THE DRAWINGS

Figure 3:
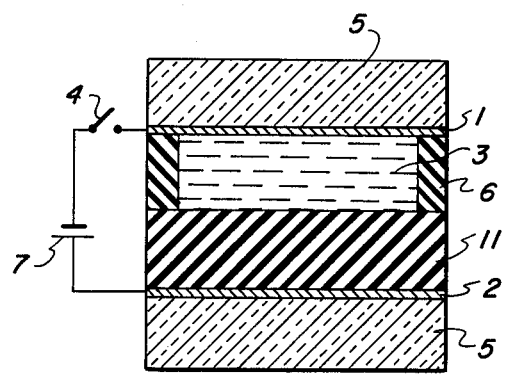
FIG. 3 is an explanatory view of an improved image recording element of the invention.

The following display method is disclosed. That is, specifically, as shown in FIG. 3, an electrochromic material 3 is inserted between transparent electrodes 1 and 2, and a photoconductive layer 11 is interposed between the electrochromic material 3 and one transparent electrode 2, whereby a suitable image is projected on the electrochromic material 3 to thereby produce a suitably shaped colored image on a portion of the electrochromic material 3 in contact with the photoconductive layer 11, or on the opposed electrode.

This method, which is used in place of conventional liquid crystals, is characterized in that an electrochromic material is used to thereby provide an image recording element of extremely high contrast.

In accordance with such image exposure, suitably shaped colored images may be obtained, and the colored images have an affinity for attracting oil while the non-image portion is hydrophilic.

In the preferred embodiment of the present invention, the affinity for attracting oil of the colored image of the image recording element obtained in a manner as noted above is utilized, which is used as masters for the offset printing. That is, the opposed electrode or the colored image obtained on the photoconductive body has an affinity for attracting oil, and those portions other than the above mentioned elements have the affinity to water. This property may be utilized to place an offset ink on an image portion that has an affinity for attracting oil and is newly used as an offset master to thereby continuously produce a large quantity of prints.

Therefore, the present invention enables to obtain offset masters of suitable images at less cost and rapidly and further enables to simply produce a large quantity of various prints.

Any suitable electrochromic material may be utilized in the instant invention. Typical of compounds suitable for the instant invention are the compounds capable of reversible, oxidation-reduction reactions such as disclosed in U.S. Pat. No. 3,736,043.

Suitable for the instant invention are aqueous solutions of benzylbiorogenhalides of the general formula:

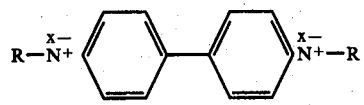

wherein R may be $CH_3(CH_2)_5$, $CH_3(CH_2)_6$ or $C_6H_5CH_2$ and X may be Cl, Br or I. These compounds give sharp images, bright colors and good printing qualities.

PREFERRED EMBODIMENTS

The following examples further define and describe methods of the instant invention for offset printing. Parts and percentages are by weight unless otherwise indicated.

EXAMPLE I

5% aqueous solution of benzylbiorogenchloride having a structure shown below:

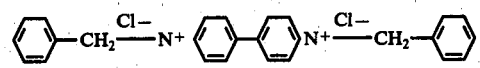

Figure 4:
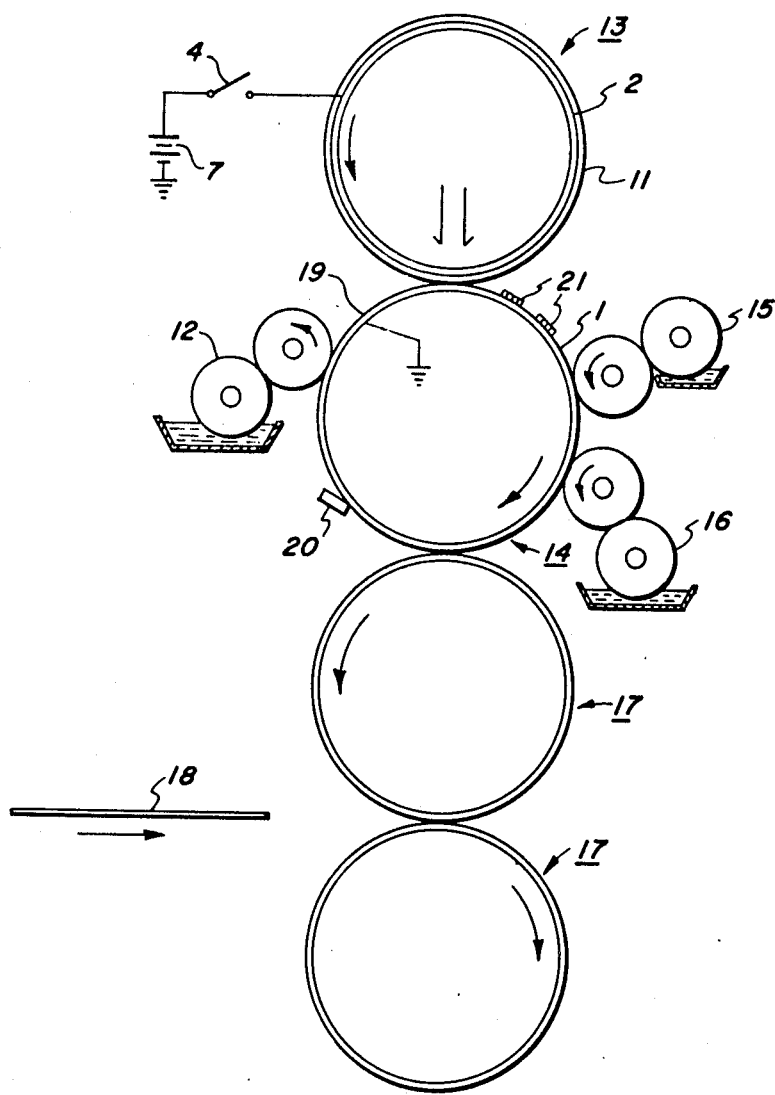
FIG. 4 illustrates an offset printing method according to the present invention.

Benzylibiorogenchloride
(Dipyrizylbenzylchloride)

is prepared, and the solution was fed to an opposed electrode 14 by means of electrochromic solution feed rolls 12 in apparatus shown in FIG. 4, and then light image irradiation was effected (about 200 lux at a white background) in the dark from the interior of a photoconductive layer 11 (with selenium vaporized on a transparent photoconductive drum) of a photoconductive drum 13. The bias voltage was the $-10V$ on the side of the opposed electrode. A blue colored image 21 was formed on the opposed electrode 14, the image 21 having an affinity for attracting oil, so that it passes through wet rolls 15 and offset ink feed rolls 16 to form an inked image. This image was transferred to rubber blankets 17, 17 in a conventional cycle of offset printing and then transferred to a transfer paper 18 to obtain good offset prints.

It should be noted that a urethane doctor blade, Shore hardness 60°, 20 may be used to clean the inked image on the opposed electrode 14 when it is no longer needed, thereby preparing a new image.

EXAMPLE II

5% solution of benzylbiorogeniodide (dipyrizylbenzyliodide) having a structure shown below is prepared in place of benzylbiorogenchloride used in Example I, and similar experiments to the former were carried out, and as a result, a red-purple colored image was obtained, thus successfully producing good printed images through the offset printing process similar to that as previously described.

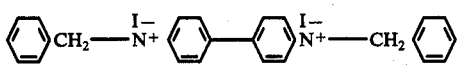

Benzylbiorogeniodide
(Dipyrizylbenzyliodide)

5% solution of benzylbiorogenbromide (dipyrizylbenzylbromide) having a structure shown below is prepared in place of benzylbiorogenchloride used in Example I, and similar experiments to the former were carried out, and as a result, a yellow-brownish colored image was obtained. This image was then subjected to wetting, inking, transferring to the rubber blanket, and printing to the paper in accordance with the cycle illustrated in Example I, as a consequence of which a good printed image was obtained.

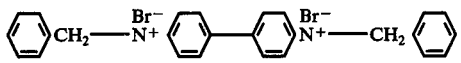

Benzylbiorogenbromide
(Dipyrizylbenzylbromide)

Although specific materials and conditions were set forth in the above exemplary processes, in the printing process of the invention these are merely intended as illustrations of the present invention. Various other substituents and processes such as those listed above may be substituted for those in the examples with similar results. In addition to the steps used to prepare the image of the present invention, other steps or modifications may be used if desirable. The image could be erased by reversal of field rather than by the doctor blade if desired. In addition, other materials may be incorporated into the aqueous electrochromic solution which will enhance, synergize or otherwise desirably effect the properties of these materials for their present use. For example, additives to increase the resistance to abrasion or to affect the ink retention properties could be added to the surface of the image.

Other modifications of the present invention will occur to those skilled in the art upon reading of the present disclosure. These are intended to be included within the scope of this invention.

What is claimed is:

1. A printing method comprising forming a layer of electrochromic material on a conductive electrode, bringing an image recording element into contact with said electrochromic material said image recording member comprising a photoconductive layer contacting the electrochromic material, applying electromagnetic radiation in an image pattern to said photoconductive layer, applying a bias voltage to the conductive electrode to form a colored ink attractive image of said electrochromic material on said conductive electrode, applying ink to said image and transferring the ink image to an image receiving surface.

2. The method of claim 1 wherein said image recording member further comprises a conductive substrate.

3. The method of claim 1 wherein said image recording member is transparent.

4. The method of claim 1 wherein said image pattern is applied by light passing through said recording member.

5. The method of claim 1 wherein said electrochromic material comprises a benzylbiorogenchloride.

6. The method of claim 1 wherein said colored image is capable of attracting oil base inks.

* * * * *